Oct. 16, 1945.  J. MERCIER  2,386,873
DUPLEX ELASTIC SEAL
Filed Aug. 16, 1943  2 Sheets-Sheet 2
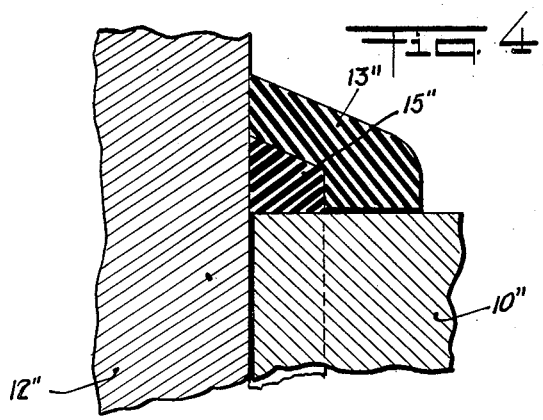
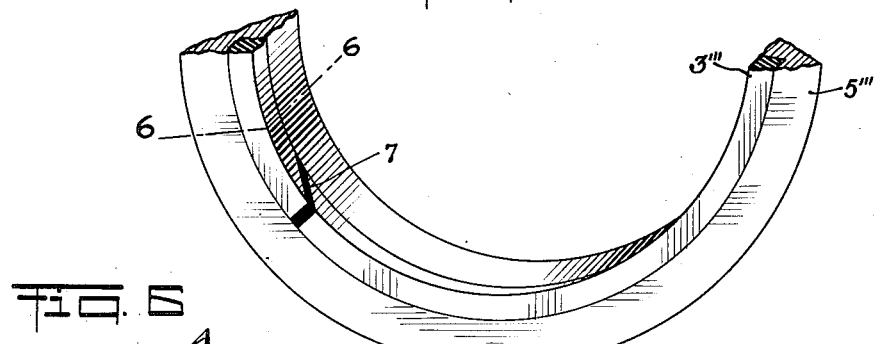
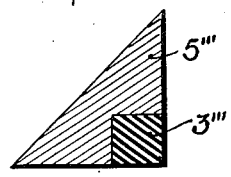
INVENTOR.
*Jean Mercier*
BY
*Howard T. Jeandron*
ATTORNEY Patented Oct. 16, 1945

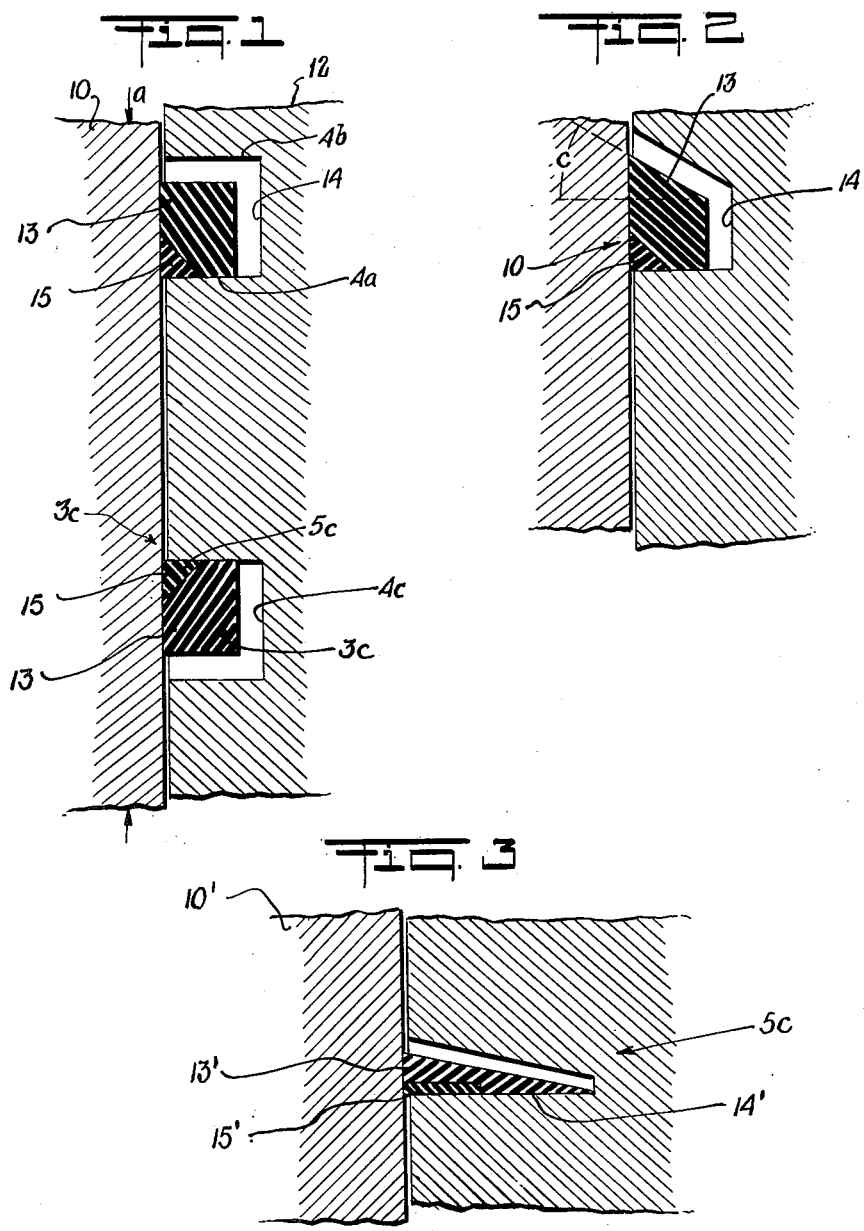

2,386,873

UNITED STATES PATENT OFFICE 2,386,873

DUPLEX ELASTIC SEAL

Jean Mercier, New York, N. Y.

Application August 16, 1943, Serial No. 498,862

6 Claims. (Cl. 286—26)

The present invention pertains to sealing means for pistons or the like in which the sealing means is made of an elastic material as, for instance, rubber or a plastic composition having suitable elastic and abrasion resisting properties.

An object of the present invention is to provide an improved sealing means, as, for instance, a piston ring made, at least partly, of an elastic material which may or may not be secured to the piston or the cylinder, which will afford a reliable seal with a minimum of friction and which may operate under a pressure of 5000 p. s. i. or more without extrusion into the clearance between piston and cylinder.

According to one embodiment of the present invention the sealing member is so mounted on or in one of the parts to be sealed that fluid pressure, when applied to the sliding system, will deform the sealing member in two directions so as to force it firmly against the surface on which it is supported or mounted, as well as against the adjacent surface or the other part to be sealed.

According to another embodiment of the present invention, the elastic material sealing member includes a base portion consisting of a harder or less elastic material supported by the part on which it is mounted.

According to a still further embodiment of the present invention, the sealing member is firmly secured or bonded to the adjacent surface of the base portion, or to the portion on which it is supported, when under load, by the part on which it is mounted, or to both said surfaces.

Further features of the present invention may be gathered from the following description of embodiments thereof given by way of example and illustrated in the accompanying drawings.

Fig. 1 is a partial section of a piston cylinder unit including a sealing member according to the present invention.

Fig. 2 is a section of a modified sealing member.

Fig. 3 is a section of another modification of the sealing member.

Fig. 4 is a section of a further modification of the sealing member.

Fig. 5 is a perspective view of an annular sealing member including a further modification thereof with respect to the preceding figures, and Fig. 6 shows a triangular cross section of the sealing member according to Fig. 5 and the square cross section of the base portion associated with the same.

In Fig. 1, 10 designates a piston and 12 a cylinder. An annular rubber band of square cross section is inserted into recessed portion 14 provided in cylinder 12. Base portion 15 of band 13 is rigid with the same but made of some harder material.

When the device is in operation the fluid pressure acting in the piston cylinder unit will compress band 13 in the axial and radial directions whereby band 13 will be more and more firmly applied against piston 10 the more the pressure rises.

Base portion 15 is to prevent any extrusion of band 3 into the clearance between piston 10 and cylinder 12. To that end it must have the required mechanical resistance. Accordingly base portion 15 may consist of a rubber composition harder than the remainder of band 13 which may be obtained in conventional manner by adding to portion 15 a higher amount of accelerator prior to vulcanization. However, portion 15 may also consist of a plastic composition or even of a metal bonded to or otherwise intimately associated with band 13.

Band 13 is preferably made of slightly smaller diameter than the surface to be sealed (piston 10).

When fluid pressure is acting on piston 10 in the direction of arrow $a$ the same forces band 13 tightly against piston 10 and wall 4a of recessed portion 14. During the return stroke of piston 10 band 13 will be applied against the opposite wall 4b of portion 14. The recessed portion in which band 13 is located must not be too large so that the displacement of band 13 during the return stroke of the piston remains small. Otherwise, the band might be injured. If it is desired to make the recessed portion large, then band 13 should be secured to the surface on which it is supported when under load so that it will not be displaced during the return stroke of the piston. When band 13 is bonded or otherwise secured to the supporting surface, then base portion 15 need not be bonded or otherwise secured.

Band 13 exerts its sealing action only in the direction of arrow $a$. Accordingly, if the piston cylinder unit is intended to be double acting, band 13 with its base portion 15 and recessed portion 14 must be duplicated as shown at 3c, 4c and 5c, respectively.

It is an advantage of the sealing member, according to the present invention, that the contact surface between the sealing member and the movable element—as a piston or the like—can be surprisingly small. Bands having a thickness of 5 mm.—dimension X—will make a satisfactory seal up to pressures of approximately 5000 p. s. i. In addition, the force with which the sealing member is applied against the surface to be sealed is substantially proportional to the fluid pressure.

The foregoing features enable the sealing member, according to the present invention, to make an efficient seal with a minimum of friction.

Another advantage of the sealing member, according to the present invention, is that no mounting is required for securing the same to the part carrying it.

Fig. 2 shows a slightly modified member of different cross section. Angle c is preferably comprehended between 30° and 60° whereby the sealing effect is improved.

Fig. 3 shows another modification of the sealing member in which band 13' has a triangular cross section. Although band 13' extends throughout the radial length of recessed portion 14' there will be, when fluid pressure is applied, a sufficient radial component, due to the triangular structure of the band, to effect the required firm application of band 13' against the surface of piston 10'.

Band 13' may be bonded in conventional manner to the surface on which it is supported when under load and, if so, base portion 15' may be independent from band 13'.

Fig. 4 shows a further modification in which two sealing bands 13" are located on both end faces of piston 10". Bands 13" are secured in conventional manner, as for instance by bonding, to the surface of piston 10", but the securement must not interfere with the radial and axial compression of band 13" by fluid pressure.

The annular base portion 15 (15' and 15") need not be a complete ring. It may be split to retain more elasticity in the radial direction. In that case, it is advantageous to fill the break in the annular base portion, as shown in Fig. 5 at 7, with a piece of rubber which may be bonded or otherwise secured to the opposing faces. This will prevent extrusion of rubber from the sealing band through the break without unduly restricting the elasticity of the base portion.

The sealing member, according to the present invention, is of particular interest in connection with shock absorbers or other devices where a minimum of friction is important for a satisfactory operation.

The foregoing description is not intended to limit the present invention which extends to all changes, modifications and equivalents within the scope of the appended claims.

What is claimed is:

1. A packing device for sealing two parts which slidably engage each other, comprising an annular sealing member made of an elastic deformable material bonded to one of said parts, said sealing member being adapted to slidably engage the surface of said other part and said sealing member including a base portion made of a harder material adjacent the face of said part on which said sealing member is affixed when under load and adjacent the working surface to be sealed, said sealing member being supported when under load on one side of its faces by a surface of the part carrying the same and on another face by a surface of the part to be sealed, all other faces thereof being freely exposed to the fluid pressure acting on said parts, said sealing member being so shaped and mounted on the part carrying it that said fluid pressure will produce a component force to seal said member against the working surfaces to be sealed.

2. A packing device for sealing two parts slidably engaging each other which comprises a sealing member made of an elastic deformable material carried in a recessed portion of one of said parts, said sealing member being adapted slidably to engage the surface of said other part and including a base portion made of a harder non-deformable material adjacent the wall of said recessed portion which supports said sealing member when under fluid pressure, said recessed portion having a larger cross sectional area than said sealing member, and said sealing member being so shaped and mounted on the part carrying it that said fluid pressure will produce a component force to seal said member against the working surfaces to be sealed.

3. A packing device for two parts, to wit, a cylinder and a piston reciprocating therein which comprises a sealing ring made of an elastic deformable material carried in a recessed portion of one of said parts, said ring being adapted to slidably engage the surface of said other part and said ring including a base portion made of a harder non-deformable material adjacent the bearing wall of said recessed portion which supports said ring, said recessed portion having in the radial and axial direction larger dimensions than said ring, and said sealing member being so shaped and mounted on the part carrying it that said fluid pressure will produce a component force to seal said member against the working surface to be sealed.

4. A packing device for sealing two parts slidably engaging each other which comprises an annular sealing member made of an elastic deformable material carried by one of said parts, said sealing member being adapted slidably to engage the surface of said other part and including a base portion made of a harder non-deformable material adjacent the face of said part on which said sealing member bears during operation, and adjacent the surface to be sealed of said other part, said sealing member being supported, under load, on one of its faces by a surface of the part carrying the same, on another face by a surface of the part to be sealed, all other faces thereof being freely exposed to the fluid pressure acting on said parts, said sealing member being so shaped and mounted on the part carrying it that said fluid pressure will produce a component force to act upon said sealing member against both said surfaces supporting the same, said sealing member being firmly secured to the adjacent surface of, at least, one of the members associated therewith, to wit, said base portion and said part carrying the same.

5. A packing device according to claim 4 in which the face of said sealing member directed toward the space where said fluid pressure is developed forms an angle with the surface to be sealed comprehended between 30° and 60°.

6. A packing device for sealing two parts slidably engaging each other which comprises a sealing member made of an elastic deformable material carried by one of said parts, said sealing member being adapted slidably to engage the surface of said other part and including a base portion made of a harder non-deformable material adjacent the face of said part on which said sealing member is supported, when under load, and adjacent the face to be sealed of said other part, said sealing member being freely exposed to fluid pressure acting on said parts so that the same will compress said member against the surface on which it is supported and produce a component force against the surface of said other part, said base portion being split to retain elasticity in the radial direction and a piece of an elastic deformable material secured to the two opposing faces of said split portion.

JEAN MERCIER.